(12) United States Patent
Ancha et al.

(10) Patent No.: US 11,787,164 B2
(45) Date of Patent: *Oct. 17, 2023

(54) APPARATUS FOR REDUCING FABRIC DIMPLING IN ELECTRONIC DEVICES AND ASSOCIATED METHODS

(71) Applicant: Google LLC, Mountain View, CA (US)

(72) Inventors: Phanindraja Ancha, San Francisco, CA (US); Yu Wei Chen, Guangzhou (CN); Brian Huynh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,188

(22) Filed: Feb. 28, 2022

(65) Prior Publication Data
US 2022/0176685 A1 Jun. 9, 2022

Related U.S. Application Data

(63) Continuation of application No. 16/983,529, filed on Aug. 3, 2020, now Pat. No. 11,260,639.

(51) Int. Cl.
*B32B 37/00* (2006.01)
*B32B 37/12* (2006.01)
*H04R 31/00* (2006.01)

(52) U.S. Cl.
CPC ...... *B32B 37/0023* (2013.01); *B32B 37/1207* (2013.01); *H04R 31/00* (2013.01); *H04R 2231/001* (2013.01)

(58) Field of Classification Search
CPC . B32B 37/0023; B32B 37/1207; H04R 31/00; H04R 2231/001; H04R 1/023
See application file for complete search history.

(56) References Cited

U.S. PATENT DOCUMENTS 11,260,639 B2 * 3/2022 Ancha ............... H04R 31/00
2003/0066596 A1 4/2003 van Manen
(Continued)

FOREIGN PATENT DOCUMENTS

JP H06205486 A * 7/1994
JP H06205487 7/1994

OTHER PUBLICATIONS

JPH06205486A Machine Translation of Description (EPO/Google) (Year: 2022).*
(Continued)

*Primary Examiner* — Cynthia L Schaller
(74) *Attorney, Agent, or Firm* — Kilpatrick Townsend & Stockton LLP (57) ABSTRACT

The present document describes an apparatus for reducing fabric dimpling in electronic devices and associated methods. The apparatus is used during assembly to prevent fabric, which is stretched over a perforated part (e.g., speaker housing), from dimpling into the holes (e.g., perforations) of the perforated part. The apparatus includes protrusions (e.g., pins), which act as a negative of the holes in the perforated part, to support the fabric as it is stretched over the perforated part. In particular, the protrusions are inserted through the perforations via an interior surface of the perforated part such that the protrusions are "proud" (slightly projecting from a surface) with respect to an exterior surface of the perforated part. The proudness of the protrusions may vary based on a degree of curvature of the perforated part at a location corresponding to a respective protrusion.

21 Claims, 7 Drawing Sheets

(56) References Cited

U.S. PATENT DOCUMENTS

| | | |
|---|---|---|
| 2006/0286344 A1 | 12/2006 | Ishii |
| 2009/0272491 A1 | 11/2009 | Kobayashi et al. |
| 2015/0027805 A1 | 1/2015 | Tsai et al. |
| 2017/0208392 A1 | 7/2017 | Smithers et al. |
| 2019/0046987 A1 | 4/2019 | Ness et al. |

OTHER PUBLICATIONS

Notice of Allowance dated Oct. 20, 2021 in U.S. Appl. No. 16/983,529.
Office Action dated Apr. 13, 2021 in U.S. Appl. No. 16/983,529.

\* cited by examiner

Assemble a perforated housing component onto a proud pin fixture including a plurality of protrusions configured to be inserted into a plurality of holes in an interior surface of the perforated housing component and to extend past an exterior surface of the perforated housing component by different predefined distances relative to one another
502

Stretch fabric over the exterior surface of the perforated housing component and the plurality of protrusions projecting from the exterior surface of the perforated housing component
504

Bond the stretched fabric to the housing component
506

Remove the housing component from the proud pin fixture
508

APPARATUS FOR REDUCING FABRIC DIMPLING IN ELECTRONIC DEVICES AND ASSOCIATED METHODS

CROSS-REFERENCE TO RELATED APPLICATION

This application is a continuation of U.S. patent application Ser. No. 16/983,529, filed Aug. 3, 2020, which is hereby incorporated by reference herein in its entirety.

BACKGROUND

Many devices, including speakers, may be wrapped in fabric for aesthetics and hiding various features, such as holes. However, when wrapping fabric around such devices, the fabric may sag into the holes. This sagging creates dimples in the fabric, resulting in a "golf ball effect" on the fabric and causing the holes to be visibly prominent.

One solution is to change the diameter of the holes (e.g., smaller holes result in less dimpling of the fabric). For a speaker, however, the number of holes and the amount of open area in the speaker housing may be designed to enable the maximum amount of audio output for the speaker, so as to avoid "choking" the speaker driver output. Therefore, reducing the number of holes or the amount of open area may degrade the quality of the audio output of the speaker. Further, modifying the holes and open area fails to solve the dimpling effect in existing products.

Some conventional solutions may attempt to hide the dimples. For example, many traditional speaker products use black and/or thick fabric to attempt to hide the holes, but the holes often remain easily noticeable. Other traditional speaker products may add noise to the color of the fabric to "trick" the user's eye into not seeing the dimpling. For example, some fabrics may have mélange, which is a medley of light and dark colors (e.g., noise). The mélange adds color noise to the fabric to reduce the visibility of the dimpling. Less mélange (e.g., lighter and more uniform color), however, can result in more-visibly-prominent dimples. Accordingly, finding a solution for existing products with lighter and more uniform colors is challenging.

SUMMARY

The present document describes an apparatus for reducing fabric dimpling in electronic devices and associated methods. The apparatus is used during assembly to prevent fabric, which is stretched over a perforated part (e.g., speaker housing), from dimpling into the holes (e.g., perforations) of the perforated part. The apparatus includes protrusions (e.g., pins, rods, cylinders), which extend outwardly from a surface of the apparatus and act as a negative of the holes in the perforated part, to support the fabric as it is stretched over the perforated part. In particular, the protrusions are inserted through the perforations via an interior surface of the perforated part such that the protrusions are "proud" (slightly projecting from a surface) with respect to an exterior surface of the perforated part. The proudness of the protrusions may vary based on a degree of curvature of the perforated part at a location corresponding to a respective protrusion.

In aspects, the apparatus is a support device (e.g., fixture) used in manufacturing to secure and support a part (e.g., a housing component) in a particular position and orientation, ensuring that a plurality of parts produced using the fixture maintain conformity and interchangeability. Accordingly, the apparatus may also be referred to as a positioning fixture.

In some aspects, a method for reducing fabric dimpling is disclosed. The method includes assembling a perforated housing component onto an apparatus including a plurality of protrusions configured to be inserted into a plurality of holes in an interior surface of the perforated housing component and to extend past an exterior surface of the perforated housing component. A predefined distance of a respective protrusion defined may be based on a degree of curvature of the exterior surface of the perforated housing component within a region of the exterior surface of the perforated housing component corresponding to the respective protrusion. In addition, the method includes, subsequent to the perforated housing component being assembled onto the apparatus, stretching fabric over the exterior surface of the perforated housing component and the plurality of protrusions projecting from the exterior surface of the perforated housing component. The method also includes bonding the stretched fabric to the housing component and removing the housing component from the apparatus.

In other aspects, an apparatus configured to prevent fabric dimpling in fabric that is stretched over a perforated housing component is disclosed. The apparatus includes a body and a plurality of protrusions. The body has an outer surface and is configured to support the perforated housing component for assembly of the fabric onto an exterior surface of the perforated housing component. The plurality of protrusions longitudinally extend from the outer surface of the body in a first direction that is substantially parallel to a second direction in which the fabric is to be stretched over the perforated housing component. In addition, the plurality of protrusions are configured to be inserted into a plurality of holes in the interior surface of the perforated housing component and project past the exterior surface of the perforated housing component to support the fabric as the fabric is stretched over the perforated housing component. A respective protrusion of the plurality of protrusions may have a longitudinal length sufficient to project past the exterior surface of the perforated housing component by a predefined distance that is defined based on a degree of curvature of the exterior surface of the perforated housing component within a region of the exterior surface of the perforated housing component corresponding to the respective protrusion.

This summary is provided to introduce simplified concepts of an apparatus for reducing fabric dimpling in electronic devices and associated methods, which is further described below in the Detailed Description. This summary is not intended to identify essential features of the claimed subject matter, nor is it intended for use in determining the scope of the claimed subject matter.

BRIEF DESCRIPTION OF THE DRAWINGS

The details of one or more aspects of an apparatus for reducing fabric dimpling in electronic devices and associated methods are described in this document with reference to the following drawings. The same numbers are used throughout the drawings to reference like features and components.

DETAILED DESCRIPTION

This document describes an apparatus for reducing fabric dimpling in electronic devices and associated methods. The apparatus is formed as a substantial negative of a perforated part (e.g., housing component) to enable the perforated part to be mounted to the apparatus. The apparatus includes a plurality of protrusions (e.g., pins), which extend outwardly from a surface of the apparatus and are configured to be inserted through the holes in the perforated part, via an interior surface of the perforated part. The protrusions extend past an exterior surface of the perforated part by a small distance (e.g., less than 0.2 millimeters (mm)). In this way, the protrusions are proud relative to the exterior surface of the perforated part and support the fabric as it is stretched over the perforated part. Supporting the fabric during the stretching of the fabric over the perforated part reduces or prevents the fabric from sagging into the holes and creating dimples.

The proudness (amount of projection from a surface) of the protrusions correlates to the curvature of the perforated part such that the proudness may vary based on a degree of curvature of the perforated part at a location corresponding to a respective protrusion. For example, protrusions may have a greater proudness (e.g., between approximately 0.1 mm and approximately 0.25 mm) relative to the perforated part in regions having a greater degree of curvature and may have less proudness (e.g., between 0.04 mm and approximately 0.1 mm) in regions having a lesser degree of curvature. Where the curvature of the perforated part is approximately zero (e.g., substantially flat region), the protrusions may be substantially flush with the exterior surface of the perforated part (e.g., the proudness of the protrusions may be approximately 0.0 mm).

While features and concepts of the described apparatus for reducing fabric dimpling in electronic devices and associated methods can be implemented in any number of different environments, aspects are described in the context of the following examples.

Figure 1:
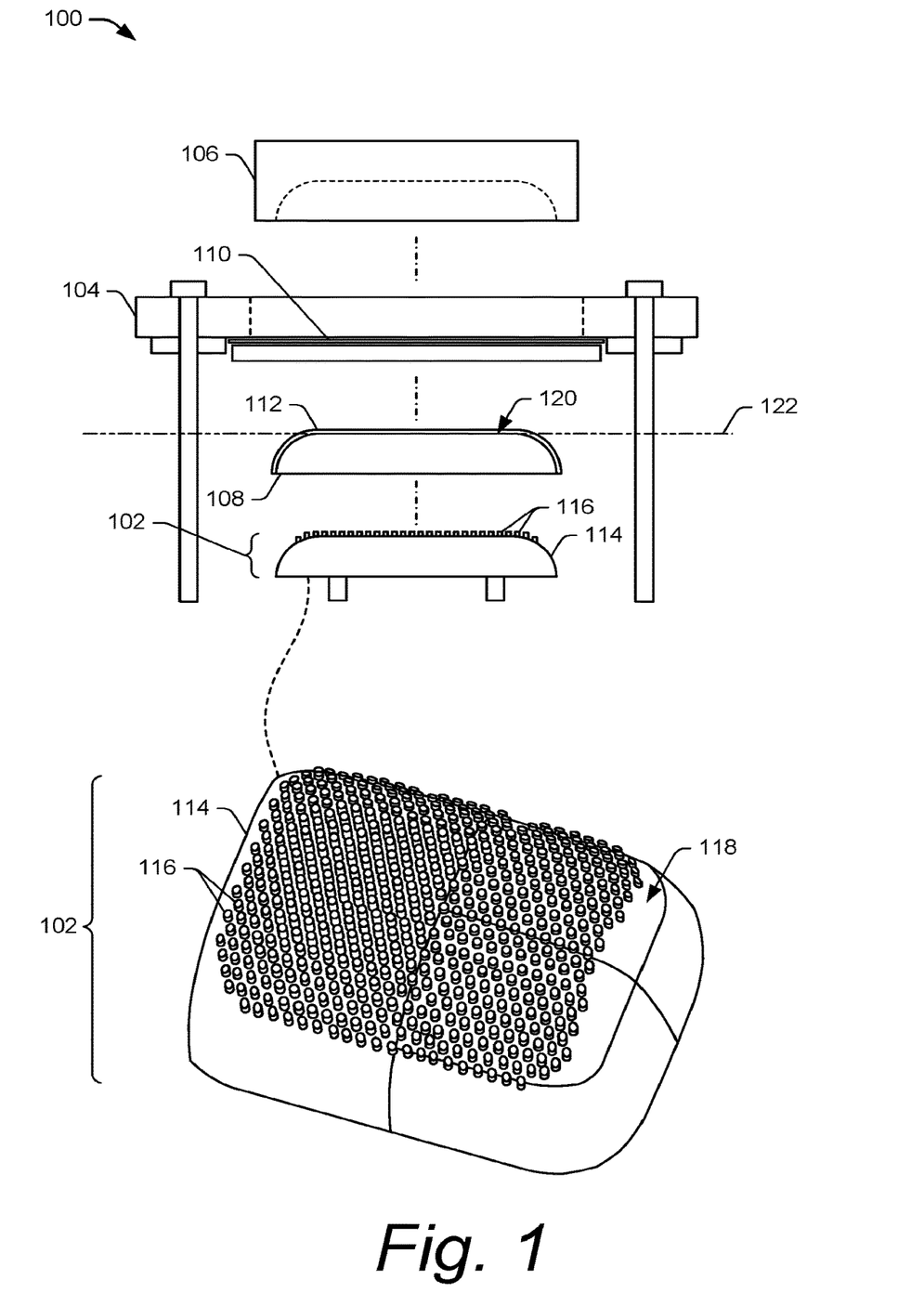
FIG. 1 illustrates an example assembly mechanism in which an apparatus for reducing fabric dimpling in electronic devices and associated methods may be implemented.

FIG. 1 illustrates an example assembly mechanism 100 in which an apparatus for reducing fabric dimpling in electronic devices and associated methods may be implemented. The assembly mechanism 100 includes a positioning fixture (e.g., apparatus 102), a fabric press 104, and a heating element 106. A perforated part, such as a housing component 108, may be seated onto the apparatus 102, which acts as a positioning fixture to secure the perforated part in a particular location and orientation. The fabric press 104 is configured to secure fabric 110 in a flattened state. The fabric press 104 may be used to press the fabric 110 onto the housing component 108 to stretch the fabric 110 over the housing component 108. The heating element 106 may be placed over the fabric 110, which is stretched over the housing component 108, to bond the fabric to the housing component 108. In aspects, a layer of bonding material 112 (e.g., adhesive) can be included between the housing component 108 and the fabric 110. The heating element 106 provides heat, through the fabric 110, to the bonding material 112 to activate the bonding material 112 and bond the fabric 110 to the housing component 108.

The apparatus 102 is formed as a substantial negative of the housing component 108. In aspects, the apparatus 102 includes a body 114 and a plurality of protrusions 116 (e.g., pins, rods, cylinders) longitudinally extending from an outer surface 118 of the body 114 in an approximate direction toward the fabric press 104 (e.g., a direction that is (i) substantially parallel to a direction in which the fabric is to be stretched over the housing component 108, or (ii) substantially normal to the fabric 110 secured by the fabric press 104). The outer surface 118 has a contour that substantially matches a contour of an interior surface of the perforated housing component 108 to enable the perforated housing component 108 to be seated, or mounted, onto the apparatus 102. The protrusions 116 are configured to be inserted through a plurality of holes (e.g., perforations) in the housing component 108.

The housing component 108 includes an exterior surface 120 having a substantially planar region that defines a plane 122. The plane 122 may be substantially parallel to the fabric 110 when the fabric 110 is secured by the fabric press 104 and when the housing component 108 is seated on the apparatus 102. For example, as illustrated in FIG. 1, the plane 122 is substantially tangential to a center point on a top surface of the housing component 108 that faces the fabric 110 in the fabric press 104. As is described in more detail below with respect to FIG. 3, the substantially planar region may be on a side of the housing component 108 that includes the holes and that faces the fabric in the assembly mechanism 100.

The fabric 110 may be any suitable fabric, such as a woven or knit textile. The fabric 110 may have some elasticity to enable the fabric to be stretched over or around at least a portion of an object, such as the exterior surface 120 of the housing component 108. The fabric 110 may be formed to enable audio signals, such as audio output of a speaker driver, to pass through the fabric 110. The fabric 110 may include one or more colors and be formed with any suitable thickness. The techniques described herein reduce fabric dimpling, which is generally more-predominantly visible in lighter and more-uniform colors.

Figure 2A:
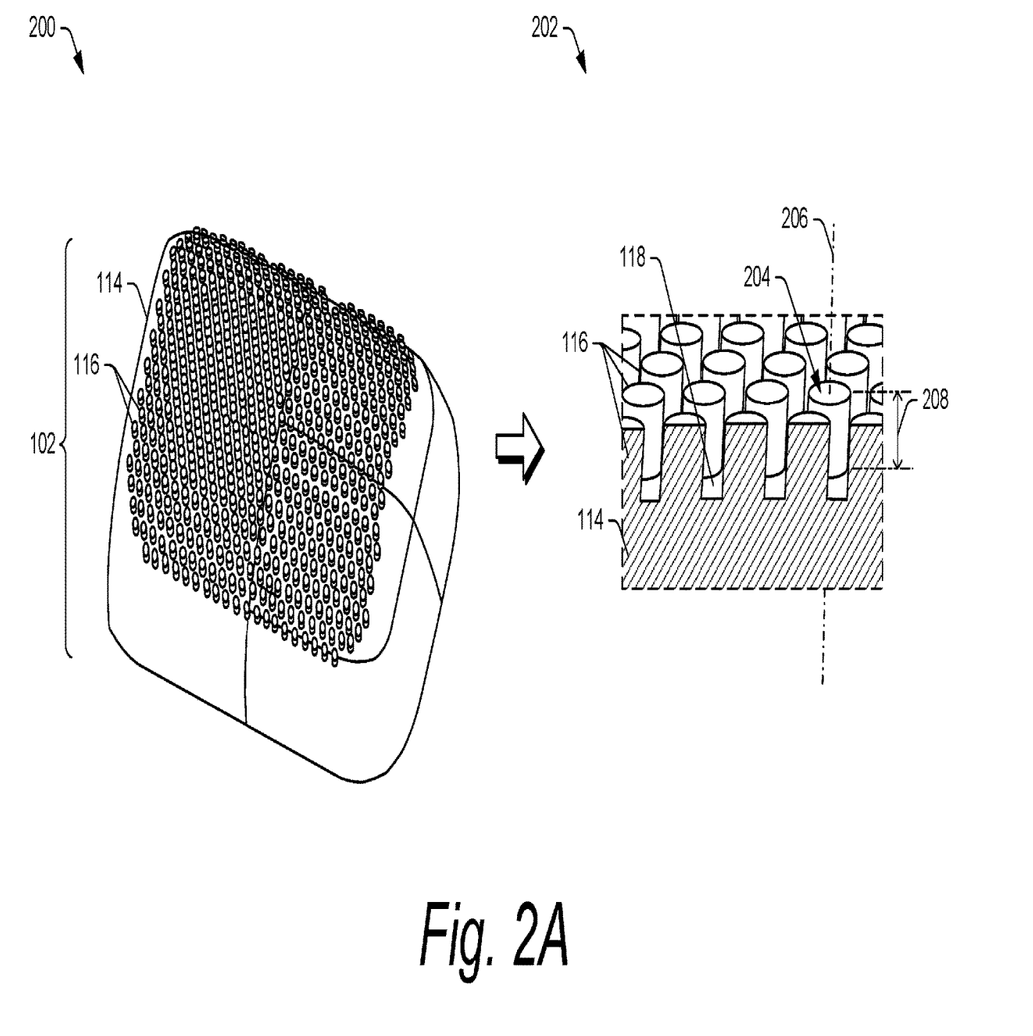
FIG. 2A illustrates an example of the apparatus from FIG. 1.

FIG. 2A illustrates an example of the apparatus from FIG. 1. In the illustrated example, a zoomed-out view 200 is shown on the left side of FIG. 2A and a zoomed-in view 202 is shown on the right side of FIG. 2A. As described above, the plurality of protrusions 116 protrude from the outer surface 118 of the body 114 of the apparatus 102. In the zoomed-in view 202, the protrusions 116 are shown as pins, rods, or cylinders, which extend from the outer surface 118 of the body 114. The protrusions 116 may be formed using the same techniques as the body 114, such as injection molding. A respective protrusion 116 may have a surface (e.g., surface 204) that intersects a longitudinal axis 206 of the respective protrusion 116 and is at an opposite end of the protrusion 116 from an end that is connected to the body 114 of the apparatus 102. In the illustrated example, the surface is substantially planar; however, the surface 204 may alternatively be convex or concave. In one example, the surface 204 of the protrusion 116 has a compound curvature, which may be offset from the exterior surface 120 of the housing component 108 at a region where the particular protrusion 116 is located when the housing component 108 and the apparatus 102 are assembled together. Alternatively, the surface 204 of a particular protrusion 116 may be substantially parallel to the exterior surface 120 of the housing component 108 at the region corresponding to the particular protrusion 116 when the apparatus 102 and the housing component 108 are assembled together. Also, the protrusions 116 may have differing longitudinal lengths (e.g., length 208) relative to one another. For example, a first subset of protrusions in a first area of the apparatus 102 may have a longitudinal length that is different than a second subset of protrusions in a second, non-overlapping area of the apparatus 102. Further details are described with respect to FIG. 3.

Figure 2B:
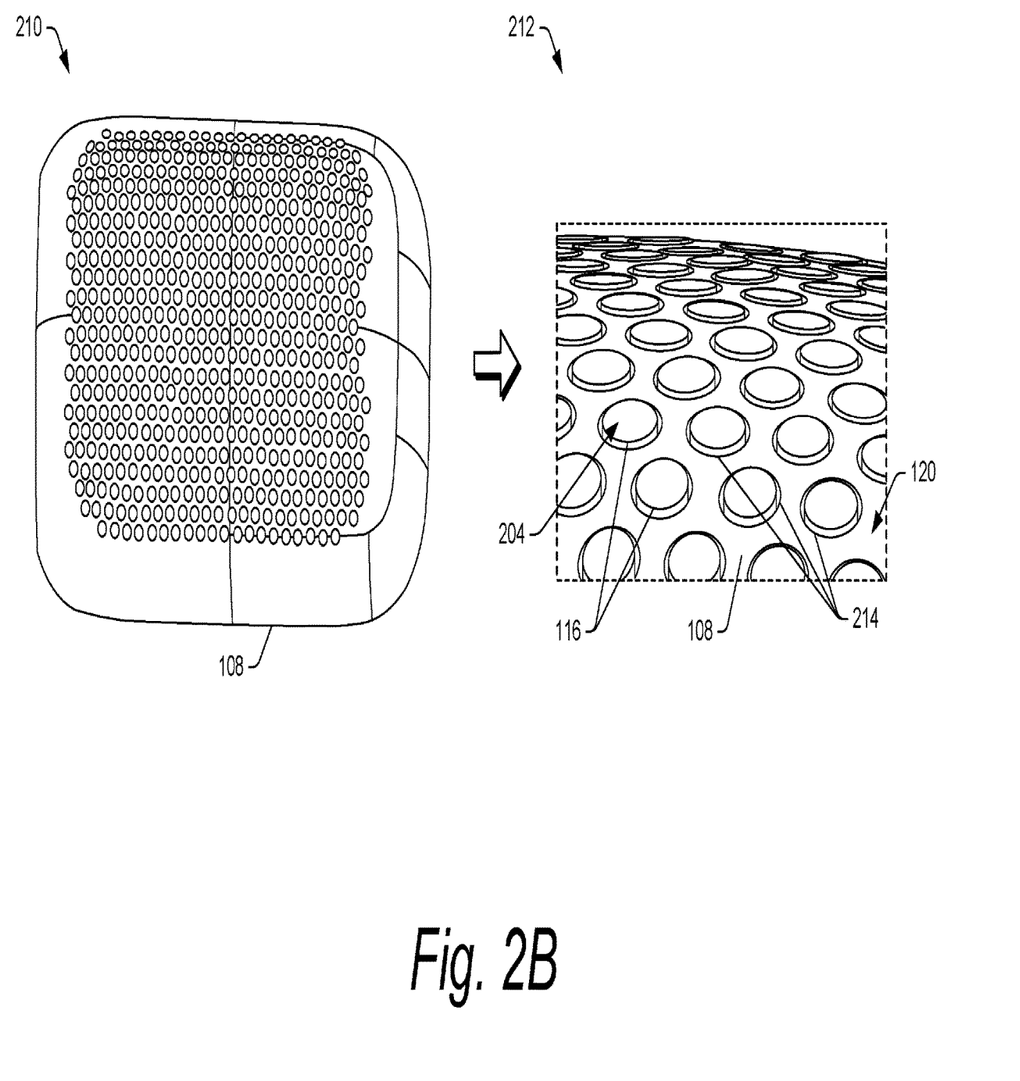
FIG. 2B illustrates an example of the housing component from FIG. 1 seated onto the apparatus from FIG. 1.

FIG. 2B illustrates an example of the housing component from FIG. 1 seated onto the apparatus from FIG. 1. In the illustrated example, a zoomed-out view 210 is shown on the left side of FIG. 2 and a zoomed-in view 212 is shown on the right side of FIG. 2. The housing component 108 is perforated such that it includes a plurality of openings (e.g., holes 214), also referred to as perforations. For a speaker, audio waves can travel through the holes 214 (e.g., audio waves originating internally from a speaker driver of the speaker or originating externally from a user providing voice commands to the speaker). The number and size of the holes 214 in the housing component 108 may be a function of the maximum audio output for the speaker. The housing component 108 may include a plastic material and be formed, for example, using plastic injection molding techniques. However, any suitable material can be used for the housing component 108.

When the housing component 108 is seated onto the apparatus 102, the protrusions 116 extend through the holes 214 from an interior surface (not shown in FIG. 2B) of the housing component 108 to the exterior surface 120 of the housing component 108. At least some of the holes 214 in the housing component 108 may have different diameters relative to one another. Each of the protrusions 116 may be sized according to a corresponding hole 214 in the housing component 108 to enable the protrusion 116 to extend through the hole 214. For example, to enable the housing component 108 to easily seat onto the apparatus 102, a respective protrusion 116 may have a diameter that is approximately 0.5 mm less than a diameter of a corresponding hole 214. The protrusions 116 are configured to be proud (slightly protrude from a surface) relative to the exterior surface 120 of the housing component 108. Accordingly, the longitudinal length (e.g., length 208) of a respective protrusion 116 may be sufficient to project past the exterior surface 120 of the housing component 108 by a predefined distance referred to as "proudness". As further described in FIG. 3, the proudness may vary based on the geometry of the exterior surface 120 of the housing component 108. In this way, the protrusions 116 of the apparatus 102 support the fabric (e.g., fabric 110 from FIG. 1) when it is stretched over the exterior surface 120 of the housing component 108, which prevents the stretched fabric from sagging into the holes 214.

Figure 3:
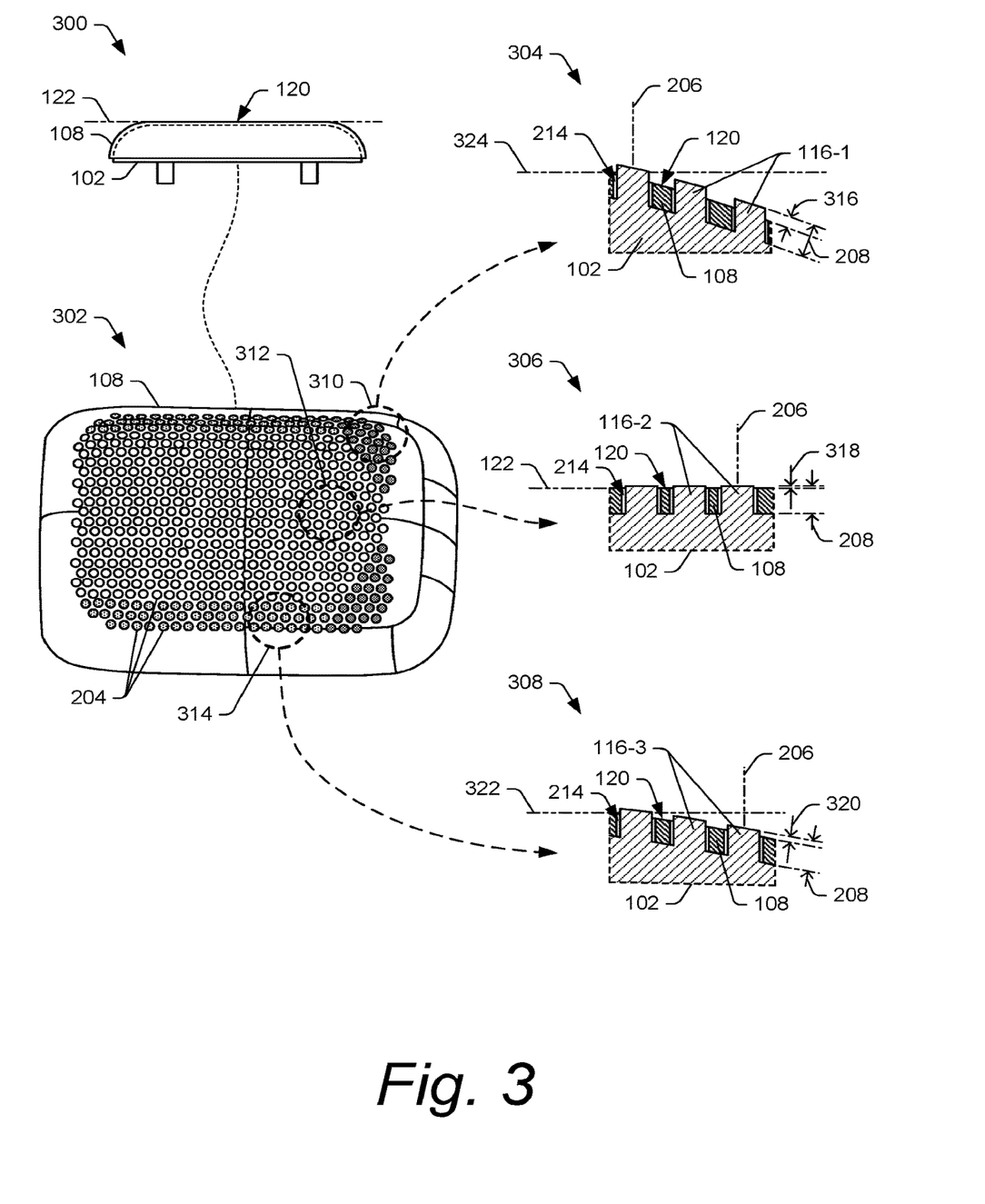
FIG. 3 illustrates an example of proudness variation in the apparatus from FIG. 1 when the housing component from FIG. 1 is assembled or seated onto the apparatus.

FIG. 3 illustrates an example of proudness variation in the apparatus 102 from FIG. 1 when the housing component 108 from FIG. 1 is assembled or seated onto the apparatus 102. A side view 300 and a top perspective view 302 of the housing component 108 seated onto the apparatus 102 are illustrated. As above, when the housing component 108 is seated onto the apparatus 102, the protrusions extend through the holes 214 of the housing component 108 from the interior surface of the housing component 108 toward the exterior surface 120 of the housing component 108. Based on the degree of curvature of the exterior surface 120 of the housing component 108, the protrusions 116 may be substantially flush with the exterior surface 120 or proud relative to the exterior surface 120. In regions where the exterior surface 120 of the housing component 108 has a more-prominent curve (e.g., near edges and corners), the protrusions 116 may have a greater relative proudness than other regions where the exterior surface 120 of the housing component 108 has a less-prominent curve (e.g., in a central region). This greater proudness is to reduce fabric dimpling that may otherwise occur in greater curvature regions having a support that is merely flush with the exterior surface 120.

In FIG. 3, section views 304, 306, and 308 of regions 310, 312, and 314, respectively, of the housing component 108 seated on the apparatus 102 are illustrated. Comparatively, the protrusions 116 in the different regions 310, 312, and 314 have different longitudinal lengths (e.g., height), such that they project past the exterior surface 120 of the housing component 108 by different predefined distances. The predefined distance of a respective protrusion 116 is defined based on a degree of curvature of the exterior surface 120 of the housing component 108 relative to the longitudinal axis 206 of the respective protrusion 116 and within a region of the exterior surface 120 corresponding to the respective protrusion 116.

For example, in the section view 304, protrusions 116-1 project from the exterior surface 120 of the housing component 108 by a distance 316; in section view 306, protrusions 116-2 project from the exterior surface 120 of the housing component 108 by a distance 318; and in section view 308, protrusions 116-3 project from the exterior surface 120 of the housing component 108 by a distance 320. The distances 316, 318, and 320 of respective protrusions 116-1, 116-2, and 116-3 may be dependent on the degree of curvature of the exterior surface 120 of the housing component 108 at corresponding regions, in particular the degree of curvature relative to the plane 122.

For instance, the section view 306 is taken from a center region (e.g., region 312) that is substantially parallel to the plane 122. The degree of curvature of the exterior surface 120 of the housing component 108 relative to the plane 122 is approximately zero in the region 312. Therefore, in substantially planar regions (e.g., the region 312), the distance 318 may be small, such as within a range of approximately 0.0 millimeters (mm) (e.g., flush with the exterior surface 120 of the housing component 108) to approximately 0.03 mm.

The section view 308, taken from a region (e.g., region 314) near an edge of the housing component 108 that is curved about one axis, is illustrated with a plane 322, which is parallel to the plane 122. The degree of curvature of the exterior surface 120 of the housing component 108 in the section view 308, relative to the plane 322, is larger than that of the section view 306. Correspondingly, the distance 320 (e.g., proudness) of the protrusions 116-3 is greater near the edges of the housing component 108 than the distance 318 of the protrusions 116-2 near the center region of the housing component 108. An example of the distance 320 used in moderate-curvature regions (e.g., the region 314) may be a distance within a range of approximately 0.11 mm to approximately 0.17 mm. An example proudness of protrusions that are in a region with a degree of curvature that is greater than that of the section view 306 and less than that of the section view 308 (e.g., a low-curvature region) may be within a range of approximately 0.04 mm to approximately 0.1 mm.

The section view 304, taken from a region (e.g., region 310) near a corner of the housing component 108 that is curved about two or more axes, is illustrated with a plane 324, which is parallel to the plane 122. The degree of curvature of the exterior surface 120 of the housing component 108 in the section view 304, relative to the plane 324, is larger than that of the section view 308. Consequently, the distance 316 of the protrusions 116-1 is greater than the distance 320 and the distance 318. An example of the distance 316 used in high-curvature regions (e.g., the region 310) may be within a range of approximately 0.17 mm to approximately 0.23 mm.

Accordingly, each protrusion 116 is formed relative to the housing component 108, such that the protrusion 116 has some dimensions (e.g., longitudinal length, three-dimensional orientation of the planar surface 204) that are defined relative to the exterior surface 118 of the housing component 108 and some other dimensions (e.g., diameter, longitudinal direction) defined relative to a corresponding hole 214 in the housing component 108. The longitudinal direction may also be substantially normal to the plane 122 to support the fabric as the fabric is stretched over the housing component 108 in a direction normal to the plane 122.

The differing proudness (distances 316, 318, and 320) of the protrusions 116 relative to the exterior surface 120 of the housing component 108 supports the fabric, when the fabric is stretched over the housing component 108, over different degrees of curvature of the exterior surface 120 of the housing component 108. Regions with a greater degree of curvature allow the fabric to stretch a greater distance, thereby increasing the tensile forces in the fabric as it is forced against the housing component 108. Normal forces between the fabric and the housing component 108 are also increased in regions with greater curvature, which results in more-prominent fabric dimpling (e.g., sagging into the holes). The greater proudness of the protrusions 116 supports these greater normal forces in the fabric and prevent the fabric from dimpling.

Figure 4:
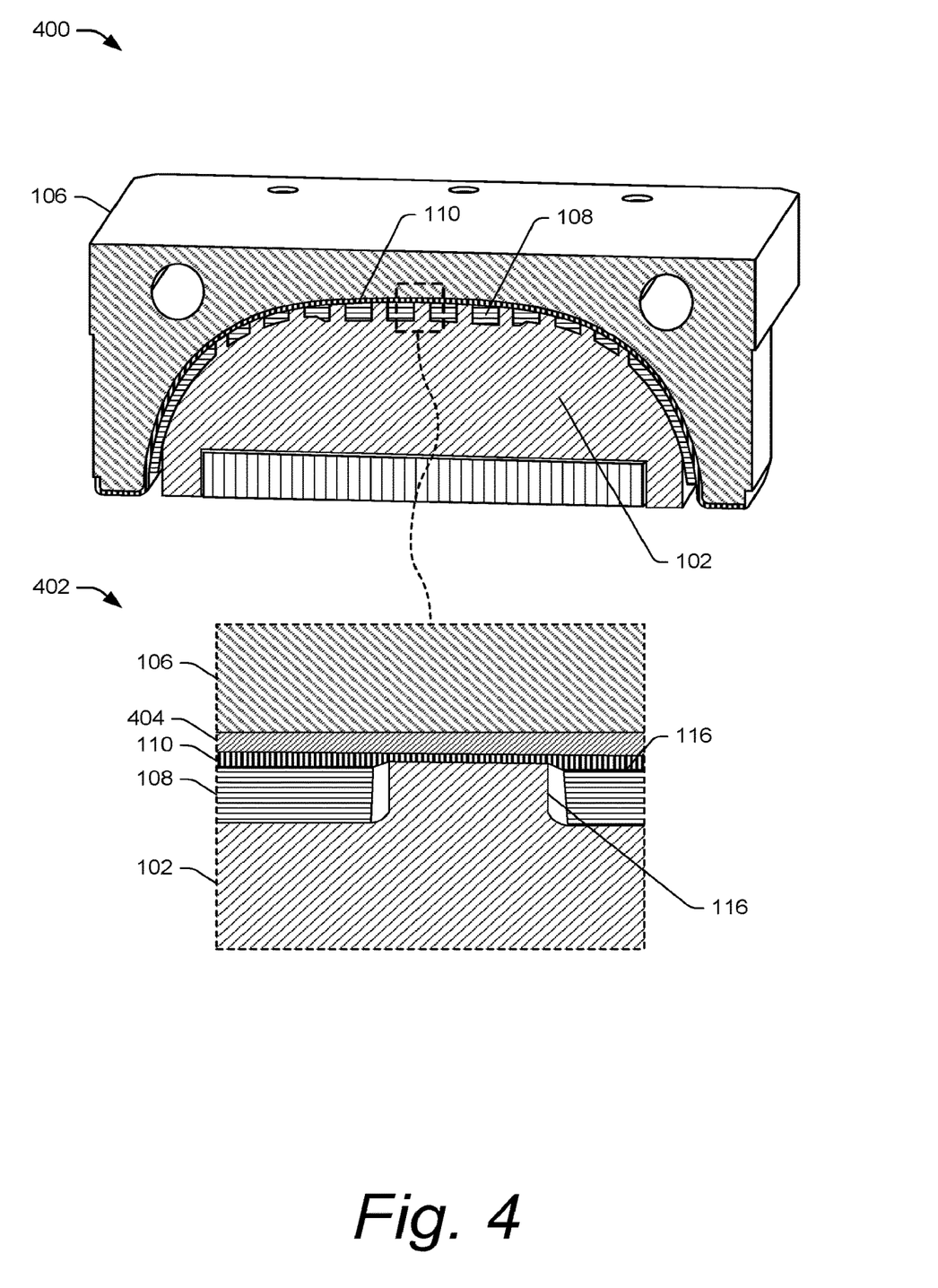
FIG. 4 illustrates a section view of an example implementation of the assembly mechanism from FIG. 1, where the heating element is placed onto the fabric, which is stretched over the housing component seated on the apparatus.

FIG. 4 illustrates a section view 400 of an example implementation of the assembly mechanism 100 from FIG. 1, where the heating element 106 is placed onto the fabric 110, which is stretched over the housing component 108 seated on the apparatus 102. In addition, FIG. 4 illustrates a zoomed-in view 402 of a portion of the section view 400. As illustrated, the protrusion 116 supports the fabric 110 that is stretched over the housing component 108. The heating element 106 may include any suitable material for conducting heat, including a copper material. A layer of protective material 404, such as silicone or other non-stick material, may be positioned between the heating element 106 and the fabric 110 to prevent the fabric 110 from adhering to the heating element 106 or to prevent the heating element 106 from damaging the fabric 110. A layer of bonding material 112 (not shown in FIG. 4) may be positioned between the fabric 110 and the housing component 108.

The bonding material 112 may include any suitable bonding material, such as an adhesive (e.g., spray adhesive, adhesive tape, liquid adhesive, etc.). The bonding material 112 may be applied to the housing component 108 prior to stretching the fabric 110 over the housing component 108 to enable the bonding material 112 to dry. If the bonding material 112 is wet at the time of stretching the fabric 110 over the housing component 108, it may hinder the stretching of the fabric 110.

Example Methods

Figure 5:
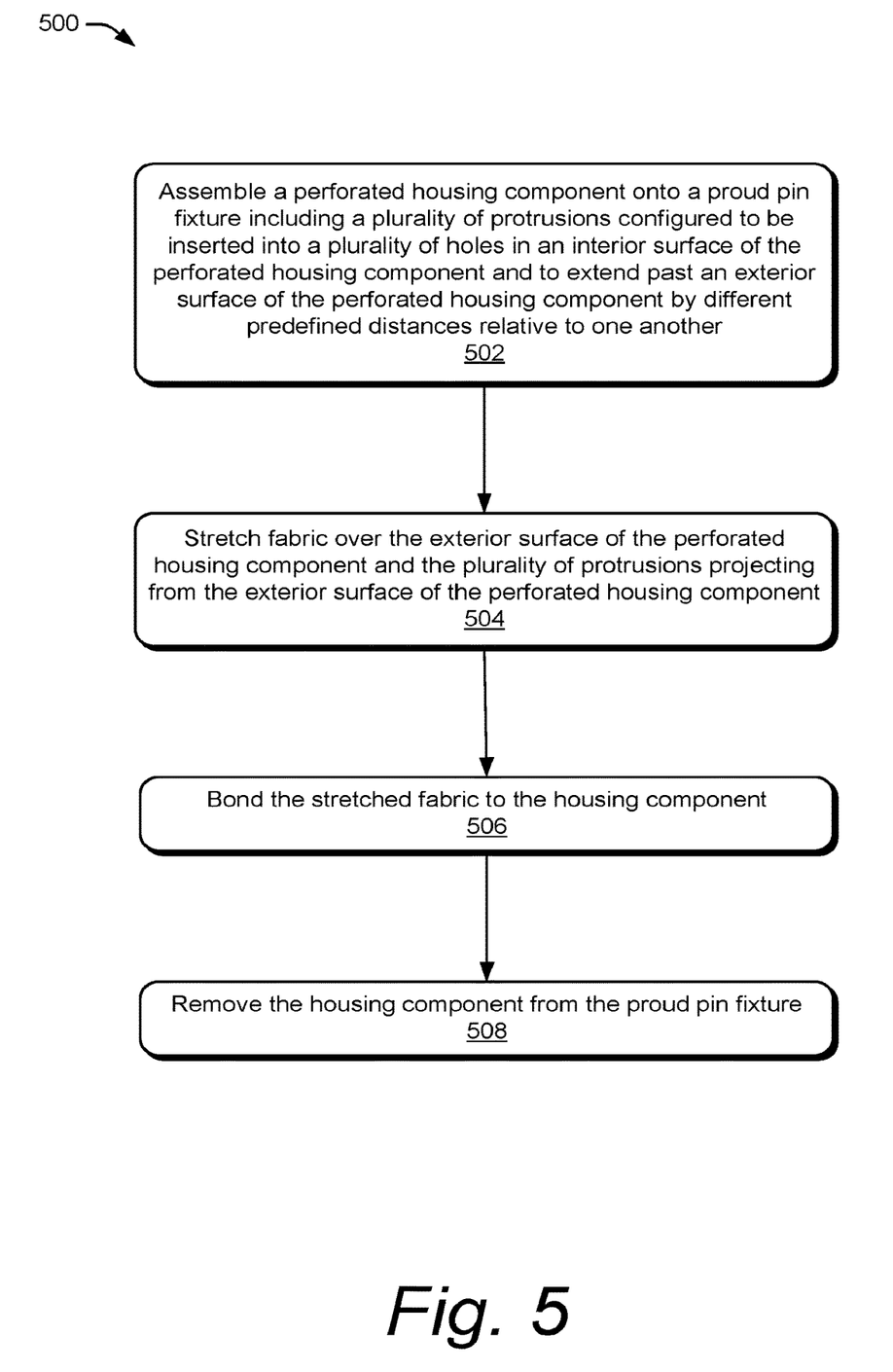
FIG. 5 depicts a method of reducing fabric dimpling in electronic devices, in particular speaker housings and associated apparatuses.

FIG. 5 depicts a method 500 of reducing fabric dimpling in electronic devices, in particular speaker housings, and associated apparatuses. The method 500 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example assembly mechanism 100 of FIG. 1 or to entities or processes as detailed in FIGS. 2-4, reference to which is made for example only. The techniques are not limited to performance by one entity or multiple entities operating on one device.

At 502, a perforated housing component is assembled onto an apparatus including a plurality of protrusions configured to be inserted into a plurality of holes in an interior surface of the perforated housing component and to extend past an exterior surface of the perforated housing component by different predefined distances relative to one another. The perforated housing component may be the housing component 108 from FIG. 1. The apparatus may be the apparatus 102 from FIG. 1 and may be formed as a negative of the perforated housing component. The plurality of protrusions (e.g., the protrusions 116) extend through the plurality of holes to project from the exterior surface (e.g., the exterior surface 120 of the housing component 108) of the perforated housing component by a predefined distance. The predefined distance (e.g., the predefined distance 316, 318, or 320) of a respective protrusion is defined based on a degree of curvature of the exterior surface of the perforated housing component relative to a longitudinal axis (e.g., the longitudinal axis 206 of the protrusion 116) of the respective protrusion and within a region of the exterior surface of the perforated housing component corresponding to the respective protrusion. Assembling the perforated housing component onto the apparatus causes a first subset of the protrusions to extend past the exterior surface of the perforated housing component by a first distance, and a second subset of the protrusions to extend past the exterior surface of the perforated housing component by a second distance that is different than the first distance.

At 504 and subsequent to the perforated housing component being assembled onto the apparatus, fabric is stretched over the exterior surface of the perforated housing component and the plurality of protrusions projecting from the exterior surface of the perforated housing component. The fabric may be the fabric 110 from FIG. 1, which is secured by the fabric press 104 of the assembly mechanism 100 and pressed onto the exterior surface 120 of the housing component 108. The protrusions 116 on the apparatus 102 support the fabric 110 from dimpling into the holes 214 of the perforated housing component.

At 506, the stretched fabric is bonded to the housing component. In aspects, the stretched fabric is bonded to the housing component by applying heat, while the perforated housing component is seated on the apparatus, to a bonding material positioned between the fabric and the perforated housing component to adhere the fabric to the perforated housing component. For example, after stretching the fabric 110 over the housing component 108, the heating element 106 is placed over the fabric 110 to apply heat, through the fabric 110, to the bonding material 112. The heat activates (e.g., by melting) the bonding material 112 to bond the fabric 110 to the exterior surface 120 of the housing component 108. Subsequent to bonding the fabric 110 to the housing component 108, the heating element 106 may be removed from fabric 110.

At 508, the housing component is removed from the apparatus. For example, subsequent to bonding the fabric 110 to the housing component 108, the protrusions 116 may be removed from the holes 214 in the housing component 108 (e.g., the housing component 108 may be unseated from the apparatus 102).

Example Devices

Figure 6:
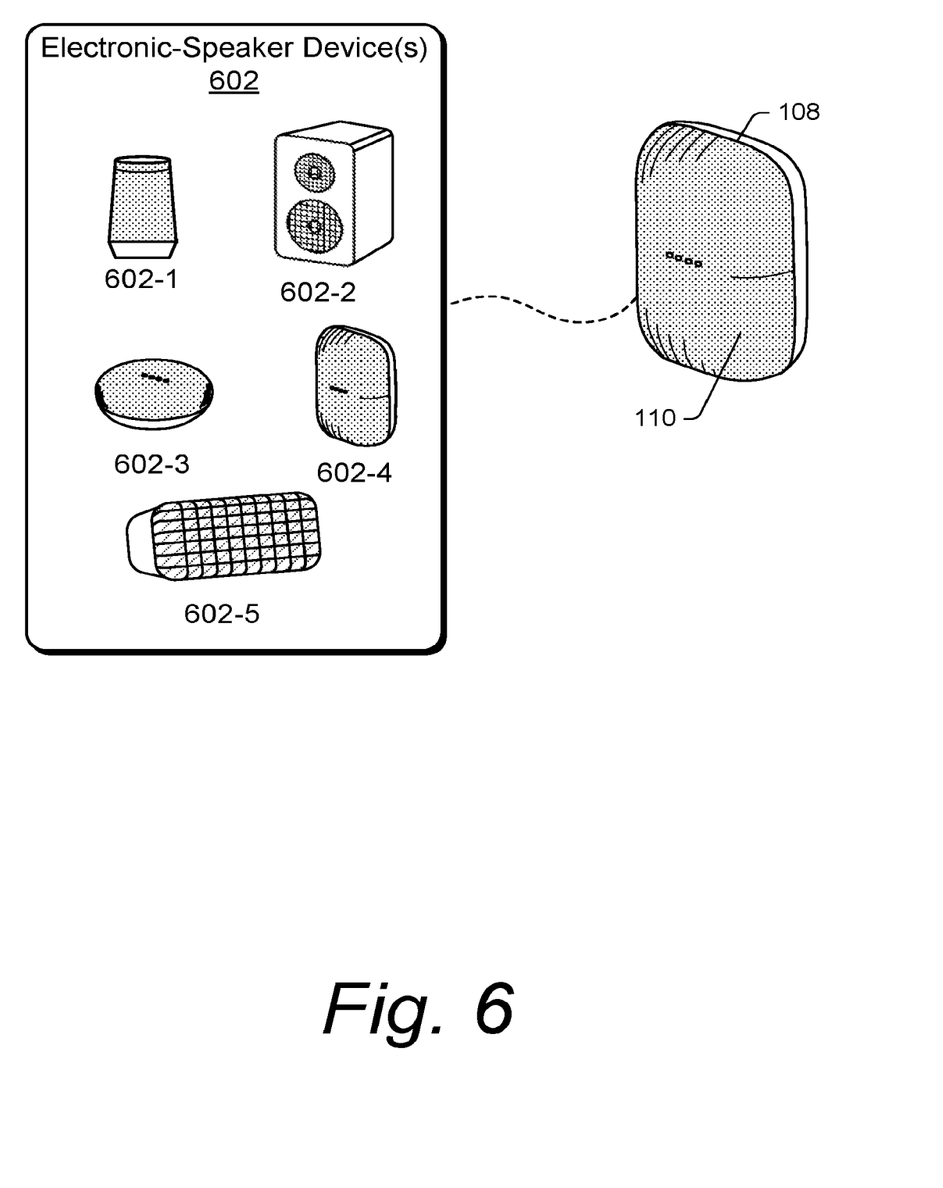
FIG. 6 illustrates example devices for which the apparatus for reducing fabric dimpling can be implemented.

FIG. 6 illustrates example devices for which the apparatus for reducing fabric dimpling can be implemented. For instance, the apparatus 102 from FIG. 1 can be used to reduce or prevent fabric dimpling from occurring during assembly of speakers, such as electronic speaker devices 602. The electronic speaker devices 602 include a housing (e.g., the housing component 108) wrapped in fabric (e.g., the fabric 110). The fabric hides perforations in the housing component, through which audio waves can travel. The electronic speaker device 602 can include any suitable geometry. Some example electronic speaker devices include a 360° output speaker 602-1, a longitudinally-vertical box speaker 602-2, a substantial prolate-spheroid-shaped speaker 602-3, a substantial oblate-spheroid-shaped speaker 602-4, and a longitudinally-horizontal box speaker 602-5. Using the techniques described herein (e.g., the apparatus 102 of FIG. 1), fabric dimpling in the fabric 110 wrapped over the housing component 108 of the electronic speaker devices 602 is reduced.

What is claimed is:

1. A method for forming fabric layers on electronic devices, the method comprising:
assembling a housing component onto an apparatus including a plurality of protrusions, where each protrusion of the plurality of protrusions is configured to extend into an opening of a plurality of openings in an exterior surface of the housing component;
stretching fabric over the exterior surface of the housing component and the plurality of protrusions projecting from the exterior surface of the housing component;
bonding the stretched fabric to the housing component; and
removing the housing component from the apparatus.

2. The method of claim 1, wherein the housing component is a perforated housing component.

3. The method of claim 1, wherein the plurality of protrusions extend past the exterior surface of the housing component a predefined distance between the exterior surface of the housing component and a respective protrusion defined based on a degree of curvature of the exterior surface of the housing component within a region of the exterior surface of the housing component corresponding to the respective protrusion.

4. The method of claim 1, wherein the assembling the housing component onto the apparatus causes a first subset of the plurality of protrusions to extend past the exterior surface of the housing component by a first distance and a second subset of the plurality of protrusions to extend past the exterior surface of the housing component by a second distance that is different than the first distance.

5. The method of claim 1, wherein the plurality of protrusions project from the exterior surface of the housing component by a greater distance at corner regions of the housing component than at a center region of the housing component.

6. The method of claim 1, wherein the plurality of protrusions are configured to support the fabric when the fabric is stretched over the exterior surface of the housing component.

7. The method of claim 1, wherein the fabric is stretched over the exterior surface of the housing component and the plurality of protrusions projecting from the exterior surface of the housing component subsequent to the housing component being assembled onto the apparatus.

8. The method of claim 1, wherein the bonding of the stretched fabric to the housing component comprises applying heat to a bonding material positioned between the fabric and the housing component to adhere the fabric to the housing component.

9. The method of claim 8, wherein the bonding material is dry when stretching the fabric over the exterior surface of the housing component and the plurality of protrusions projecting from the exterior surface of the housing component.

10. The method of claim 1, wherein the plurality of protrusions extend longitudinally in a first direction that is substantially parallel to a second direction in which the fabric is assembled to the exterior surface of the housing component.

11. An apparatus for forming fabric layers on electronic devices, the apparatus comprising:
a body having an outer surface, the body configured to support a housing component for assembly of a fabric onto an exterior surface of the housing component; and
a plurality of protrusions longitudinally extending from the outer surface of the body in a first direction that is substantially parallel to a second direction in which the fabric is to be stretched over the housing component, wherein a first subset of the plurality of protrusions are located in a central region of the body that is substantially planar, and wherein a second subset of the plurality of protrusions are located proximate to a periphery of the body that is curved, and one or more protrusions of the second subset of the plurality of protrusions have greater longitudinal lengths than one or more protrusions of the first subset.

12. The apparatus of claim 11, wherein the housing component is a perforated housing component.

13. The apparatus of claim 11, wherein the fabric traveling on a fabric press is pressed onto the housing component that is supported by the body and wherein the plurality of protrusions is configured to be inserted into a plurality of holes in an interior surface of the housing component and project past the exterior surface of the housing component to support the fabric as the fabric is stretched over the housing component.

14. The apparatus of claim 13, wherein a respective protrusion of the plurality of protrusions has a longitudinal length sufficient to project past the exterior surface of the housing component by a predefined distance that is defined based on a degree of curvature of the exterior surface of the housing component within a region of the exterior surface of the housing component corresponding to the respective protrusion.

15. The apparatus of claim 14, wherein the predefined distance of the respective protrusion of the plurality of protrusions is defined to prevent the fabric from sagging into a corresponding hole of the plurality of holes when the fabric is stretched over the exterior surface of the housing component.

16. The apparatus of claim 14, wherein the respective protrusion has a first end that is connected to the body and a second end that is opposite the first end and that has a surface having a compound curvature that is offset from the exterior surface of the housing component at the region corresponding to the respective protrusion.

17. The apparatus of claim 16, wherein the second end is configured to support the fabric when the fabric is stretched over the exterior surface of the housing component.

18. The apparatus of claim 11, wherein the first subset of the plurality of protrusions project past the exterior surface of the housing component by a first distance when the housing component and the apparatus are assembled together, wherein the second subset of the plurality of protrusions extend past the exterior surface of the housing component by a second distance when the housing component and the apparatus are assembled together, and wherein the second distance is different than the first distance.

19. The apparatus of claim 18, wherein the first distance is correlated to a curvature of the exterior surface of the housing component at a first region corresponding to the first subset of the plurality of protrusions, wherein the second distance is correlated to the curvature of the exterior surface of the housing component at a second region corresponding to the second subset of the plurality of protrusions, and the second distance is greater than the first distance based on the exterior surface of the housing component having a greater degree of curvature at the second region in comparison to another degree of curvature at the first region.

20. The apparatus of claim 11, wherein the plurality of protrusions project past the exterior surface of the housing component by different predefined distances when the housing component and the apparatus are assembled together, and wherein the different predefined distances include greater distances at corner regions of the housing component in comparison to a center region of the housing component.

21. The apparatus of claim 11, wherein the body and the plurality of protrusions are formed using injection molding.

* * * * *